(12) United States Patent
Chen et al.

(10) Patent No.: US 10,450,230 B2
(45) Date of Patent: Oct. 22, 2019

(54) FIRE RESISTANT ECO CONCRETE BLOCKS CONTAINING WASTE GLASS

(71) Applicant: Nano and Advanced Materials Institute Limited, Hong Kong (HK)

(72) Inventors: Binmeng Chen, Hong Kong (HK); Honggang Zhu, Hong Kong (HK); Man Lung Sham, Hong Kong (HK); Yifei Yan, Hong Kong (HK); Bo Li, Ningbo (CN)

(73) Assignee: Nano and Advanced Materials Institute Limited, Hong Kong (HK)

( * ) Notice: Subject to any disclaimer, the term of this patent is extended or adjusted under 35 U.S.C. 154(b) by 93 days.

(21) Appl. No.: 15/716,488

(22) Filed: Sep. 26, 2017

(65) Prior Publication Data

US 2019/0092685 A1    Mar. 28, 2019

(51) Int. Cl.
    *C04B 14/22*     (2006.01)
    *C04B 28/06*     (2006.01)
    *C04B 111/28*    (2006.01)

(52) U.S. Cl.
    CPC ............. *C04B 14/22* (2013.01); *C04B 28/06* (2013.01); *C04B 2111/28* (2013.01); *C04B 2201/20* (2013.01); *C04B 2201/30* (2013.01); *C04B 2201/50* (2013.01)

(58) Field of Classification Search
    CPC ..... C04B 14/22; C04B 28/06; C04B 2111/28; C04B 2201/20; C04B 2201/30
    See application file for complete search history.

(56) References Cited

U.S. PATENT DOCUMENTS

| | | | |
|---|---|---|---|
| 3,963,506 A | 6/1976 | Shutt et al. | |
| 4,344,796 A | 8/1982 | Minnick | |
| 4,963,191 A | 10/1990 | LaFleur | |
| 5,525,153 A | 6/1996 | Cosola | |
| 6,776,237 B2 | 8/2004 | Dao et al. | |
| 7,364,615 B1 | 4/2008 | Bryant | |
| 7,726,662 B2 * | 6/2010 | Foster ................ | F16J 15/0825 277/592 |
| 7,744,691 B2 | 6/2010 | Elizer et al. | |
| 7,771,529 B1 * | 8/2010 | McPherson ............. | C04B 14/22 106/716 |
| 8,137,454 B2 | 3/2012 | McPherson | |
| 8,236,230 B2 * | 8/2012 | McPherson ............. | C04B 14/22 106/716 |
| 8,480,802 B2 * | 7/2013 | McPherson ............. | C04B 14/22 106/716 |
| 8,663,386 B2 | 3/2014 | McPherson et al. | |
| 9,034,097 B2 | 5/2015 | Wu et al. | |
| 9,365,457 B2 | 6/2016 | Wu | |
| 9,376,344 B2 | 6/2016 | Ramsey | |
| 2002/0053304 A1 | 5/2002 | Pelot | |
| 2002/0142911 A1 | 10/2002 | Akaishi | |
| 2003/0037708 A1 | 2/2003 | Monawar | |
| 2003/0041783 A1 * | 3/2003 | Monawar ............... | C04B 14/106 106/716 |
| 2006/0000172 A1 | 1/2006 | Sumrall | |
| 2008/0098934 A1 * | 5/2008 | Kwak ..................... | C04B 28/02 106/711 |
| 2009/0301355 A1 | 12/2009 | Eide | |
| 2010/0052220 A1 | 3/2010 | Burns | |
| 2014/0208984 A1 | 7/2014 | Campbell | |
| 2016/0264468 A1 | 9/2016 | Burgos Enriquez | |
| 2017/0081249 A1 | 3/2017 | Gauci | |

FOREIGN PATENT DOCUMENTS

| | | | |
|---|---|---|---|
| CN | 105967606 A | * | 9/2016 |
| CN | 107032810 A | * | 8/2017 |
| JP | 2005047771 A | * | 2/2005 |
| KR | 1020080017966 A | * | 2/2008 |
| KR | 1020110077123 A | * | 7/2011 |
| WO | 1994019294 A1 | | 9/1994 |
| WO | WO-2004101464 A1 | * | 11/2014 |

* cited by examiner

*Primary Examiner* — Anthony J Green
(74) *Attorney, Agent, or Firm* — Idea Intellectual Limited; Margaret A. Burke; Sam T. Yip (57) ABSTRACT

A composition for forming fire resistant concrete block, that includes a cementitious binder material comprising alumina cement, recycled fine aggregate, and recycled coarse aggregates, the recycled fine aggregates including 10-50 wt % recycled particulate glass cullet having a particle size of 600 microns or less, a concrete block formed from the composition exhibiting a decrease in thermal conductivity with increasing temperature at temperatures causing the particulate glass cullet to melt. A concrete block fabricated from the composition exhibits a fire resistance of at least three hours, a density below 2000 kg/m$^3$, and a compressive strength of at least 7 MPa.

11 Claims, 10 Drawing Sheets

FIG.6(a) A/C=6 *With AC*

FIG.6(b) A/C=6 *With AC & Glass*

FIG.6(c) A/C=8 _With AC_

FIRE RESISTANT ECO CONCRETE BLOCKS CONTAINING WASTE GLASS

FIELD OF THE INVENTION

The field of the invention relates to concrete incorporating waste products and, more particularly, to fire resistant concrete blocks including waste glass.

BACKGROUND

Concrete is a composite material made from aggregates, such as sand and gravel, bound together with a binder such as cement. Typically, aggregates are obtained from mining combined with a crushing operation to produce particulates of a desired size. However, mining operations can disrupt the local environment and mines are often located far from population centers that require large quantities of aggregates.

With increasing concern over the excessive exploitation of natural aggregates, recycled aggregates have been explored as a new source of aggregate material with a goal of sustainable development. Sources of recycled aggregates include construction waste such as recycled concrete aggregates and recycled red brick aggregate; these are used to produce concrete products, such as low grade concrete and non-load bearing concrete blocks. Using construction waste to produce eco concrete blocks has been successfully implemented in various regions and is gaining wider acceptance. However, the present eco concrete block products show a limited fire resistance, especially those with relatively high strength, limiting their use in applications with the most stringent fire resistance requirements, for example, multiple-hour fire resistance. With increasing concern regarding the fire safety of modern buildings, especially high-rise buildings, there is a demand for improved fire resistance of building materials. Thus, there is a need in the art for fire-resistant concrete blocks that include waste material.

SUMMARY OF THE INVENTION

The invention focuses on a formulation/composition/mix design for fire resistant eco concrete blocks. As set forth below, laboratory block preparation and characterization (compressive strength, density, and fire resistance), trial production of blocks, and full scale standard fire tests for the developed blocks were conducted to realize the invention. At least three hours fire resistance period was achieved in concrete blocks incorporating waste glass cullet of selected size along with selected (blended) cement, with some formulations even achieving four hours fire resistance period.

In particular, the present invention relates to a composition for forming fire resistant concrete block, the composition including cementitious binder material having alumina cement, recycled fine aggregate, and recycled coarse aggregates, the recycled fine aggregates comprising 10-50 wt % recycled particulate glass cullet having a particle size of 600 microns or less, such that a concrete block formed from the composition exhibits a decrease in thermal conductivity with increasing temperature at temperatures causing the particulate glass cullet to melt.

DETAILED DESCRIPTION:

To ensure the fire safety of a building, it is important to ensure that the elements of a structure will not collapse but remain standing or hold back the fire and heat for a prescribed time. In case of fire, a fire rated element will be used to separate fire spread between compartments. Thus, the building materials are rated according to relevant fire resistance standards. Two criteria for rating fire resistance are integrity performance and insulation performance. Integrity performance measures the ability of a building materials specimen to prevent the passage of flames and hot gases through it and to prevent the occurrence of flame on the unexposed side. Insulation performance measures the ability of a specimen to restrict the temperature rise of the unexposed face to below specific level.

Surprisingly, it was determined that the introduction of particulate waste glass cullet of a selected size improves fire resistance, mainly by improving the heat insulation property of concrete blocks. The mechanism is that, when exposed to fire, the particulate glass cullet with a size of less than approximately 600 microns will absorb heat and melt gradually (at temperatures below 1000° C.), resulting in reduced heat transfer through the block thickness within specified period. Moreover, due to melting of glass, the thermal conductivity of concrete block is reduced, also leading to reduction in heat transfer through the block thickness within a specified period. This is due to the fact that the thermal conductivity of molten glass is lower than the thermal conductivity of the corresponding particulate glass and also due to the thermal absorption that occurs during the phase change from a solid to a liquid. Typically, the glass cullet begins to soften at approximately 600° C.; high temperatures bring high flowability in the glass.

To determine the overall concrete composition, several major factors, in terms of material aspect, influencing the fire resistance of concrete blocks include the type and content of cement, water-to-cement ratio, and the type and content of aggregate, etc., were investigated. Adjustment in the concrete mix design and use of an appropriate type of cement/aggregate can sometimes double the fire resistance period of concrete. The influence of water content, aggregate/cement ratio, type and contents of cement and aggregates used in concrete blocks and size of aggregates were also investigated. The composition includes at least 70 wt % recycled construction waste starting materials. As set forth in the Background, the recycled construction waste starting materials are recycled concrete aggregate and recycled red brick aggregate. The composition may be approximately 70% to 90% percent aggregate, including fine aggregate and coarse aggregate. As discussed below, fine aggregates are materials having a particle size ranging from approximately 0.075 mm to approximately 4.75 mm, while coarse aggregates are materials having a particle size ranging from approximately 4.75 mm to 9.5 mm.

As set forth in the description below, fire resistant concrete blocks were realized by incorporating waste glass cullet along with various other concrete components. In an exemplary embodiment, a concrete composition includes waste glass cullet having a particle size of 600 microns or less and includes alumina cement. More particularly, the composition may include lightweight aggregates for improved heat insulation, and use a low water/cement ratio, low paste volume content and optimized particle size grading of aggregates to improve integrity.

Cement Composition:

As the concrete components of the present invention are bound together by cement, a cement composition was created having low thermal conductivity for use in the final concrete product. Various cement compositions were fabricated and tested as set forth below.

For cement type, different additives including ground-granulated blast furnace slag (GGBS), fly ash (FA), silica fume (SF) and alumina cement (AC), were added to a balance of ordinary Portland cement (OPC). GGBS: Slag is the material left over when a metal has been separated (e.g., smelted) from its respective metal ore. Granulated ground blast furnace slag is produced by quenching of molten iron slag (a by-product of iron and steel-making) from a blast furnace followed by grinding. The main components of granulated ground blast furnace slag are CaO (30-50%), $SiO_2$ (28-38%), $Al_2O_3$ (8-24%), and MgO (1-18%). All percentages set forth in the description are weight percentages unless otherwise indicated. FA: Fly ash is a coal combustion product that is formed when particles escape with flue gases during combustion. Depending upon the composition of the coal, the fly ash contains varying amounts of silicon dioxide ($SiO_2$) aluminum oxide ($Al_2O_3$), and calcium oxide (CaO). SF: Silica fume is a by-product of the production of elemental silicon or ferrosilicon alloys in electric arc furnaces and is amorphous $SiO_2$ with a particle size on the order of 100-200 nm. AC: Alumina cement includes calcium aluminate made by reacting a lime-containing material with an aluminous material to produce calcium aluminates. Typical ranges of aluminum oxide ($Al_2O_3$) are from about 39 percent to about 80 percent of the composition with ranges of calcium oxide (CaO) of about 20 percent to 40 percent. The aluminum oxide and calcium oxide are typically in the form of monocalcium aluminate ($CaAl_2O_4$). OPC: Ordinary Portland Cement is a type of hydraulic cement that typically includes calcium oxides, silica, and alumina in various proportions. Compositions of Portland cement may include CaO in a range of 61-67%, $SiO_2$ in a range of 19-23%, $Al_2O_3$ in a range of 2.5-6%, $Fe_2O_3$ in a range of 0-6% and sulfate in a range of 1.5-4.5%. Various compositions of Portland cement are set forth in ASTM C150/C150M-16e1 "Standard Specification for Portland Cement", available from ASTM International, West Conshohocken, PA, 2016, the disclosure of which is incorporated by reference herein. Any of these compositions may be used as the OPC of the present invention.

To determine exemplary formulations, cement compositions were prepared with various levels of each additive. Detailed mix proportions are set forth in Table 1. The water to powder ratio was set at 0.35 for all of the compositions. The content of replacement additives was continuously increasing from 0% to 30% every 10%, except the silica fume group due to workability problems.

TABLE 1

Mix formulation of paste for cement type study

| Group | FA | GGBS | SF | AC | OPC | Water |
|---|---|---|---|---|---|---|
| Control | 0 | 0 | 0 | 0 | 1 | 0.35 |
| C90FA10 | 0.1 | 0 | 0 | 0 | 0.9 | 0.35 |
| C80FA20 | 0.2 | 0 | 0 | 0 | 0.8 | 0.35 |
| C70FA30 | 0.3 | 0 | 0 | 0 | 0.7 | 0.35 |
| C90G10 | 0 | 0.1 | 0 | 0 | 0.9 | 0.35 |
| C80G20 | 0 | 0.2 | 0 | 0 | 0.8 | 0.35 |
| C70G30 | 0 | 0.3 | 0 | 0 | 0.7 | 0.35 |
| C95SF5 | 0 | 0 | 0.05 | 0 | 0.95 | 0.35 |
| C90SF10 | 0 | 0 | 0.1 | 0 | 0.9 | 0.35 |
| C85SF15 | 0 | 0 | 0.15 | 0 | 0.85 | 0.35 |
| C90AC10 | 0 | 0 | 0 | 0.1 | 0.9 | 0.35 |
| C80AC20 | 0 | 0 | 0 | 0.2 | 0.8 | 0.35 |
| C70AC30 | 0 | 0 | 0 | 0.3 | 0.7 | 0.35 |

The specimens were demolded after 24 hours and then immersed in a water tank for curing. After 28 days' curing, the specimens were put in an oven with 105° C. for drying. Then the dried specimens were transferred into a muffle furnace, the target studied temperature in this invention contained room temperature, 300° C., 600° C., 900° C., 1200° C. The heating rate was 3° C./min to reach the target temperature and then kept at target temperature for 2 hours and then cooled down naturally. Volume change of all specimens was measured to evaluate the thermal stability of the blended cement and thermal conductivity was recorded to compare the heat transfer resistance of blended sample before and after heating.

Results of volume change of GGBS, FA, SF and AC were shown in FIG. 1(a), FIG. 1(b), FIG. 1(c), and FIG. 1(d) respectively. From FIG. 1, it can be easily summarized that the volume of all blended cement is reduced with temperature rising; however, alumina cement blended with OPC performed the best with 30% replacement, having a 87.4% remaining volume. According to the results, 30% replacement of alumina cement was suggested.

Figure 1:
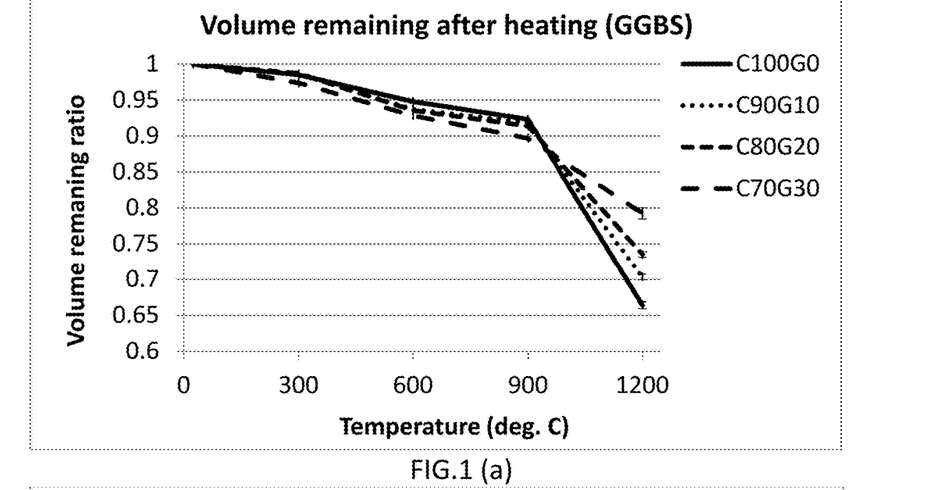
FIGS. 1(a), 1(b), 1(c) and 1(d) depict the volume change as a function of temperature for various cement compositions.
Figure 2:
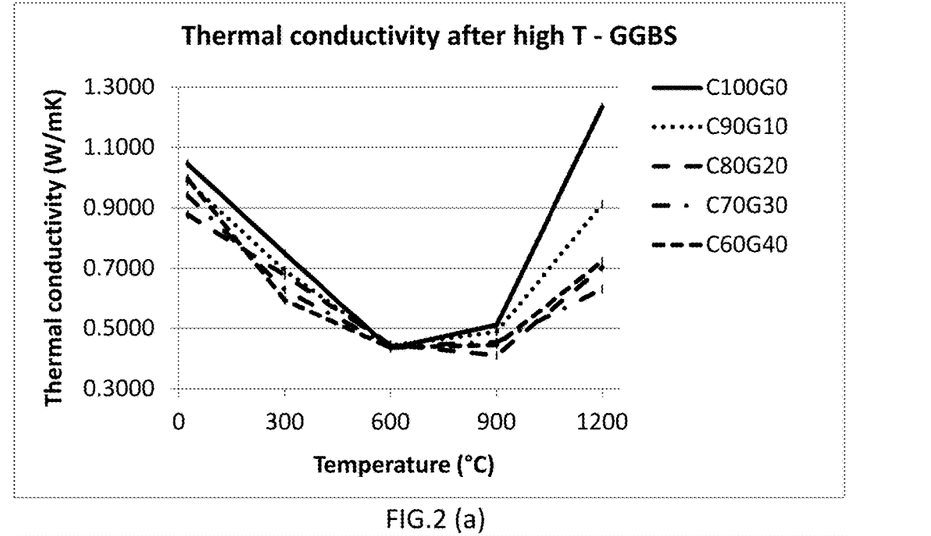
FIGS. 2(a), 2(b), 2(c), and 2(d) depict thermal conductivity changes as a function of temperature for various cement compositions.

Besides the performance of volume change, thermal conductivity is also important since the blended cement acts as a barrier during a fire. FIG. 2 represents the thermal conductivity of blended cement sample before and after application of high temperatures. FIG. 2 shows that the thermal conductivity of blended cement decreases firstly from room temperature to 900° C. and then rises from 900° C. to 1200° C. It is postulated that the initial decrease in thermal conductivity between room temperature to 900° C. is due to C-S-H and CH decomposition which would lead to an increase in the porous structure of a specimen. Above 900° C., sintering may occur, increasing thermal conductivity. Alumina cement blended with OPC performed the best among the blended cement sample studied, especially for 20% and 30% replacement, which has the lowest thermal conductivity value of 0.52 W/m k.

Combining the two aspects of additives, 30% replacement of OPC with alumina cement was determined to be an exemplary composition for use in the production of the concrete of the present invention.

Glass Size:

Since recycled waste glass cullet was used as a thermal insulation material, different size was studied. The size investigated here contained <0.6 mm, 0.6-1.18 mm, 1.18-2.36 mm and 2.36-4.75 mm. Mortar containing recycled waste glass cullet, instead of concrete, was studied. Detailed mix formulation was shown in table 2.

The fire tests for evaluating the fire resistance of concrete blocks are performed using the method specified in BS 476 part 22 or BS EN 1364-1. According to these two standards, integrity and thermal insulation are the two criteria for fire resistance rating. In such a fire test, a 3 m×3 m wall specimen composed of the concrete blocks being tested is installed in the opening of a testing chamber, with one face exposed to fire while the other face is unexposed to fire. To conduct the test, fire is ignited in the testing chamber, and the temperature in chamber rises following the specified temperature rising curve to 1200° C. Five thermocouples are installed in an array on the unexposed face of concrete block to measure the temperature rise of unexposed face of wall specimen. Moreover, the integrity of the wall specimen in terms of crack width and flame leaking and also the deflection of wall specimens are monitored.

TABLE 2

Mix formulation for mortar containing waste glass cullet

| OPC | Glass | Water |
|---|---|---|
| 1 | 0.5 | 0.3 |

To compare the properties of recycled fine aggregate and glass, lab-scale fire tests were conducted. The lab-scale fire test was conducted using a furnace, with one face of block specimen exposed to the high temperature in furnace chamber, while the opposite face of specimen exposed to air. The rise of temperature in furnace chamber was consistent with the temperature rise curves specified in BS 476-22 or BS EN 1364-1. Five thermocouples were also installed on the unexposed face of block specimen to record temperature rise. The lab-scale fire test results of 100% recycled fine aggregate and 100% recycled glass are depicted in FIGS. 3(a) and 3(b), respectively.

Figure 3:
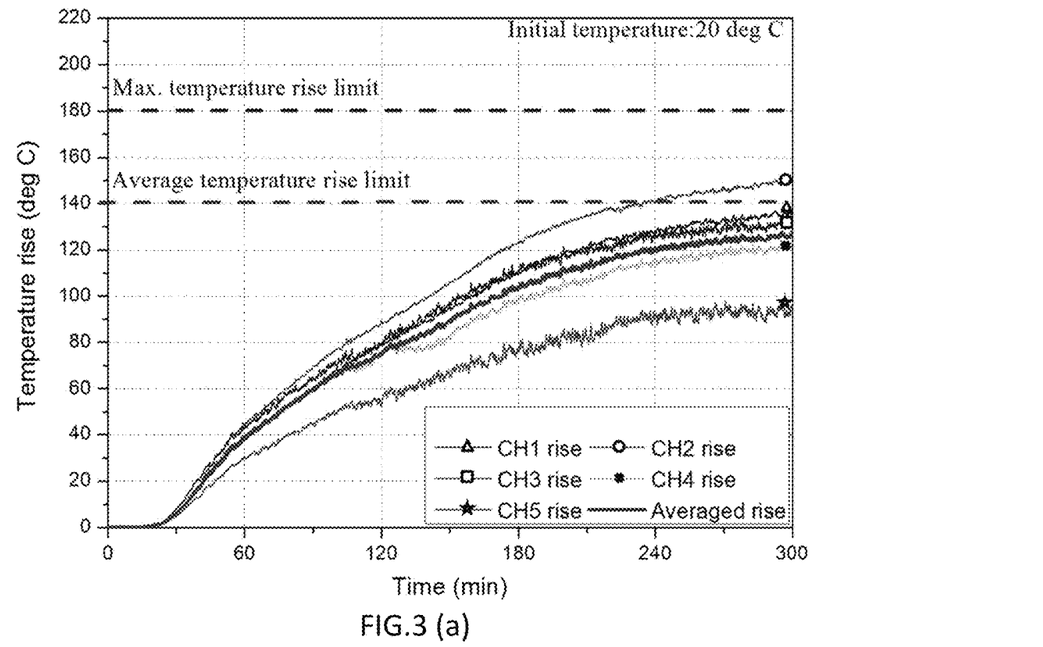
FIGS. 3(a)-3(b) depict the results for a lab-scale fire test results for mortar including 100% recycled fine aggregate and 100% recycled glass cullet.
Figure 4A:
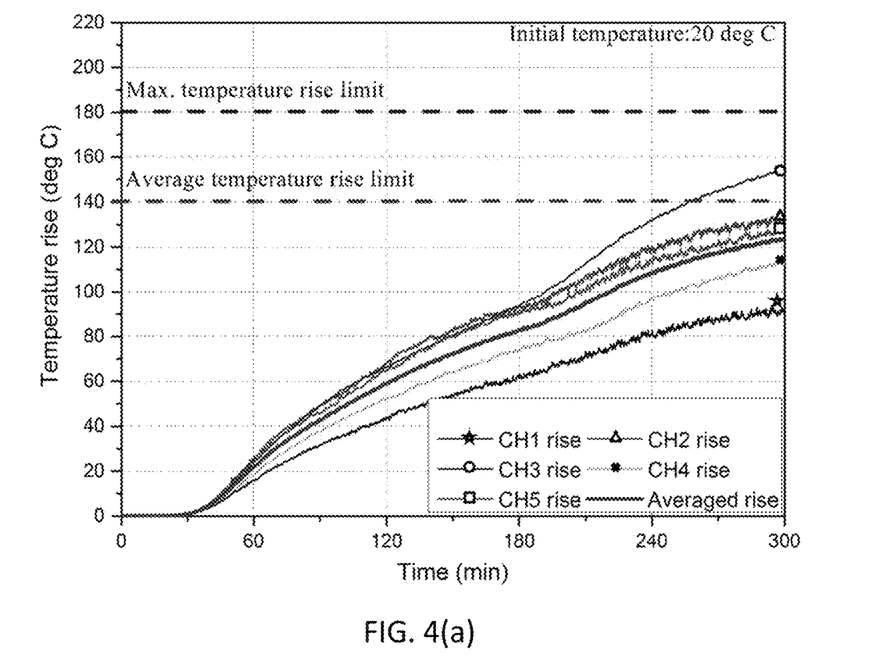
FIGS. 4(a)-4(b) depict lab-scale fire test results of mortar prepared with particulate recycled glass cullet smaller than 0.6 mm and larger than 2.36 mm.
Figure 4B:
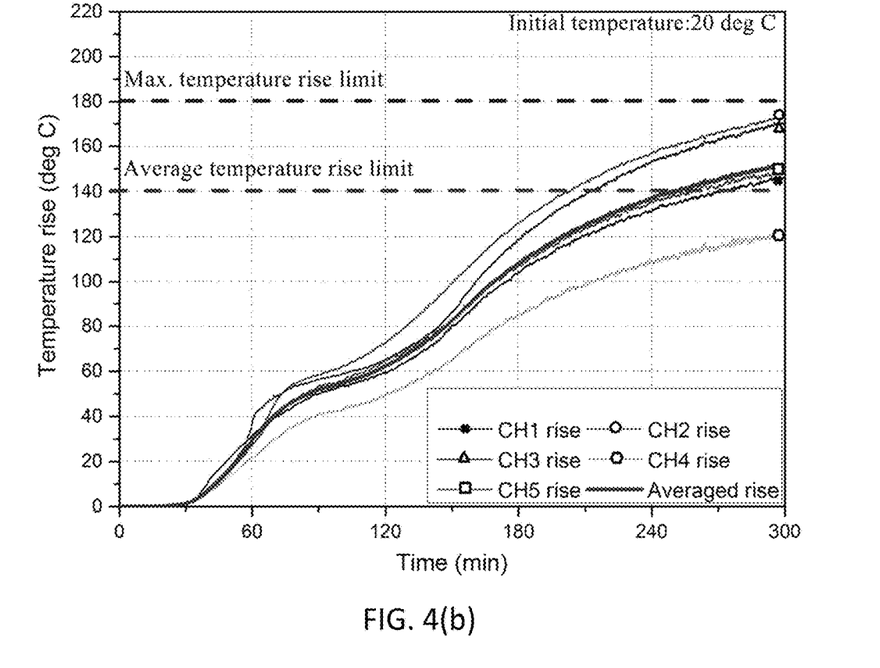

From FIG. 3 it can be seen that recycled glass of mixed sizes, on its own, does not help improve the fire resistance of mortar. Therefore, glass was sieved to different sizes to study the size effect. FIG. 4(a) and FIG. 4(b) depict the fire test results of mortar prepared with recycled glass particle size smaller than 0.6 mm and particle size larger than 2.36 mm.

From FIG. 4(a) and FIG. 4(b), it is demonstrated that recycled particulate glass with a smaller size (<0.6 mm) has a better insulation property than larger size glass (>2.36 mm). Therefore, particulate recycled glass having a size of approximately 600 microns or less is selected for use in the fire-resistant concrete composition.

Fine to coarse aggregate ratio: For the aggregates studied, fine aggregate has a size range from approximately 0.075 mm to 4.75 mm while coarse aggregate has a size range from approximately 4.75 mm to 9.5 mm.

Figure 5:
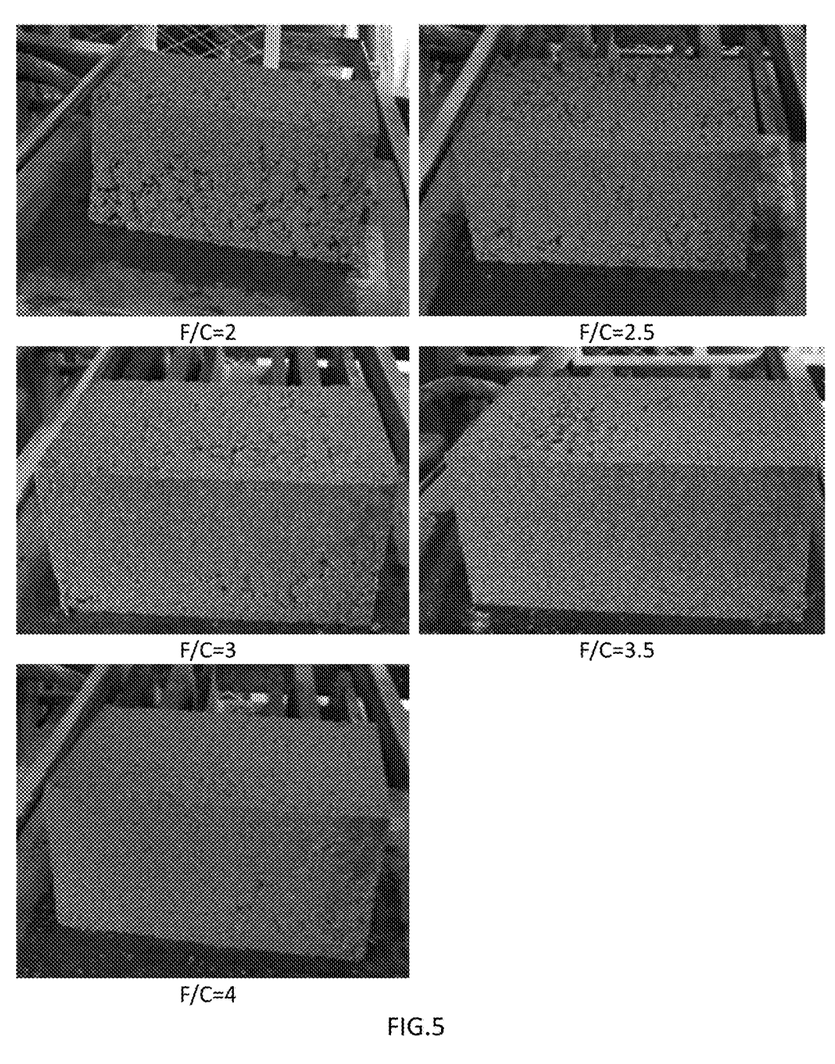
FIGS. 5 depicts the appearances of specimens at different fine aggregate to coarse aggregate ratios.

To fabricate concrete block having a relatively smooth surface finish, varied fine aggregate to coarse aggregate ratios were investigated, including 2, 2.5, 3, 3.5, and 4. The appearances of corresponding block specimens are depicted in FIG. 5.

According to the results, to make the blocks having an acceptable surface finish, the content of fine aggregate relative to coarse aggregate ((F/C) ratio) should be larger than 3.

Final mix formulation

Based on the above findings, 4 varied concrete compositions were formulated, as example, according to Table 3 below:

TABLE 3

Designed mix formulations of fire resistant concrete blocks

| | | OPC | AC | Recycled fine aggregate | Recycled glass cullet (<0.6 mm) | Recycled coarse aggregate | |
|---|---|---|---|---|---|---|---|
| 1 | A/C = 6 With AC | 1.169 | 0.501 | 8 | | 2 | 0.99 |
| 2 | A/C = 6 With AC & Glass | 1.169 | 0.501 | 4 | 4 | 2 | 0.99 |
| 3 | A/C = 8 With AC | 0.875 | 0.375 | 8 | | 2 | 0.99 |
| 4 | A/C = 8 With AC & Glass | 0.875 | 0.375 | 4 | 4 | 2 | 0.99 |

Figure 6A:
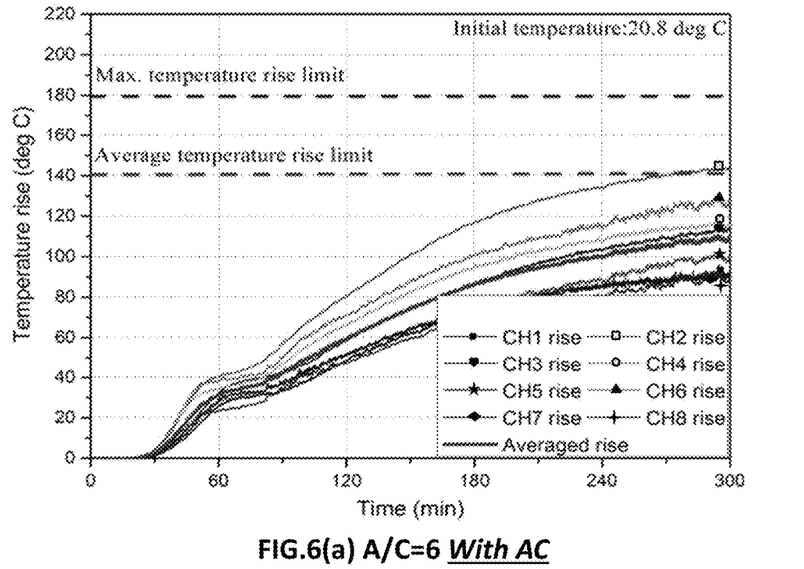
FIGS. 6(a), 6(b), and 6(c) depict the lab-scale fire test results of concrete blocks of designed formulations.
Figure 6B:
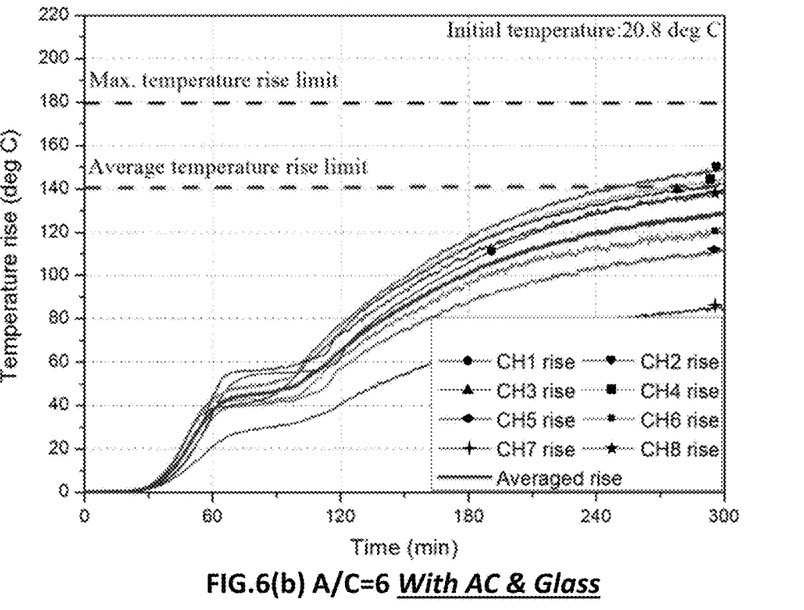
Figure 6C:
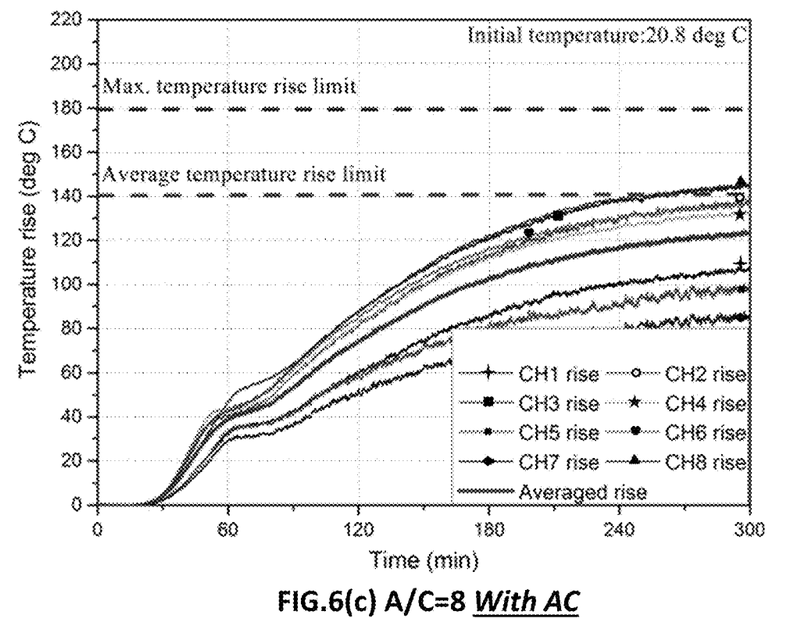

FIGS. 6(a) to 6(c) depict fire test results for concrete blocks corresponding to compositions 1 to 3 From FIG. 6, all three mix formulations can pass the fire test even after five hours, which can achieve the requirements of fire test standard BS 476 part 22, which contains averaged temperature rising lower than 140° C. and highest temperature rising lower than 180° C. Alumina cement mixed with OPC can effectively enhance the fire resistance property of the concrete block.

Figure 7:
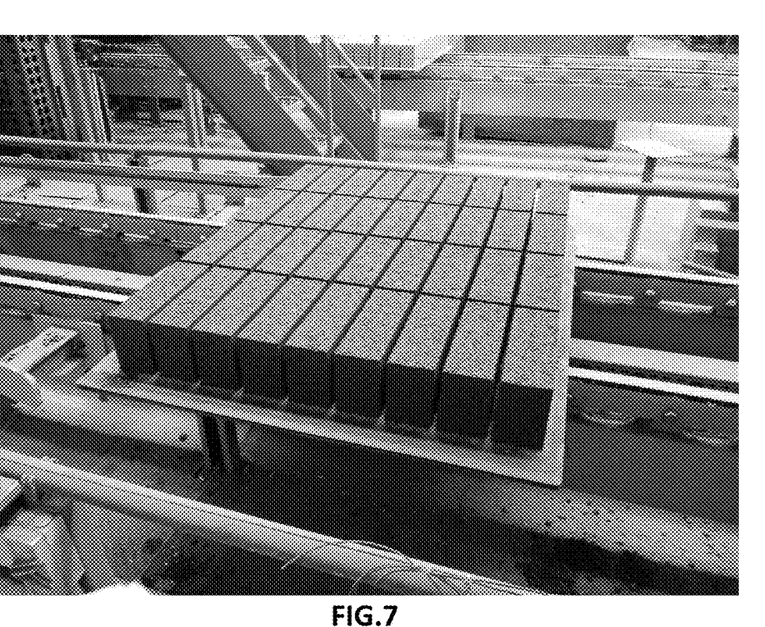
FIG. 7 depicts the concrete blocks produced in volume.

Concrete blocks have been produced in volume in plant following the above four designed formulations. A semi-dry concrete system was used for block production. FIG. 7 depicts the blocks produced. The density of produced blocks was below 2000 kg/m$^3$ and the strength of produced blocks were measured to be above 10 MPa. The concrete blocks may also be made by casting.

Figure 8:
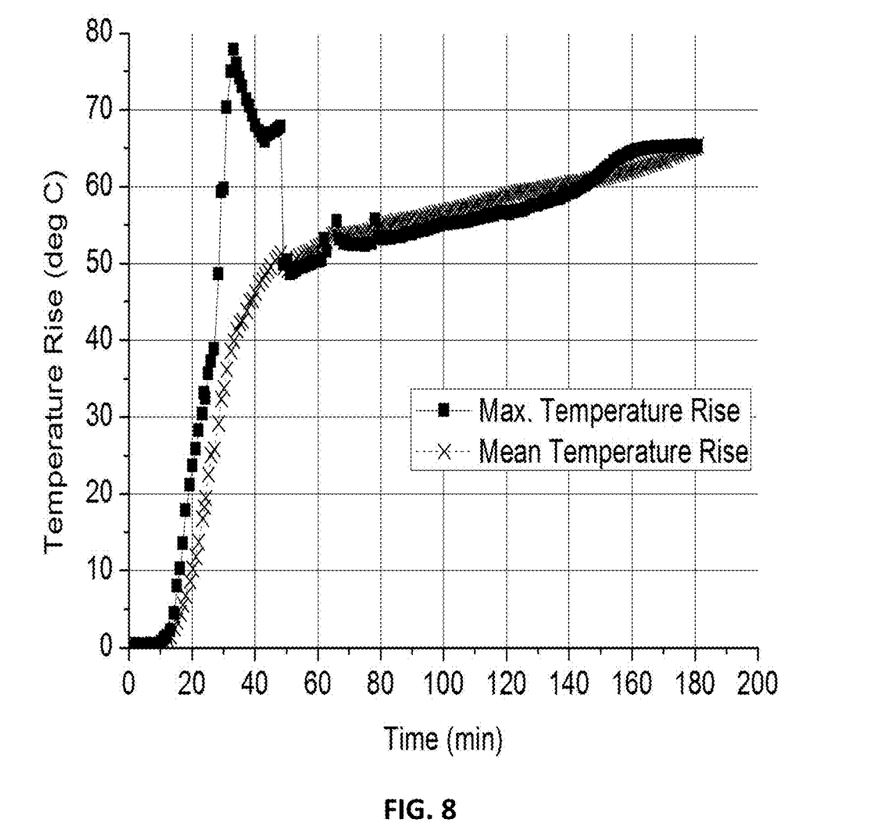
FIG. 8 depicts the maximum and average temperature rise curves of the unexposed surface of a wall specimen composed of concrete blocks in a full scale fire test.

A 3 m×3 m×0.1 m (thick) wall specimen composed of the concrete blocks made following the designed formulation 2 above was subject to full scale fire test according to BS EN 1364-1; the test was lasted three hours. The results show that the wall specimen passed the fire test in terms of insulation, integrity and deflection after three hours. FIG. 8 depicts the maximum and average temperature rise curves of the unexposed surface of the wall specimen. After three hours, the maximum and average temperature rises of the unexposed surface were about 80° C. and 65° C. respectively, which are far below the insulation criteria specified in BS EN 1364-1.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the specification, and following claims.

The invention claimed is:

1. A composition for forming fire resistant concrete block including at least 70 wt % recycled construction waste starting materials, the composition comprising:
   cementitious binder material including alumina cement;
   recycled fine aggregates having 10-50 wt % recycled particulate glass cullet having a particle size of 600 microns or less, with the balance selected from one or more of construction waste recycled concrete aggregate or construction waste recycled red brick aggregate having a particle size ranging from approximately 0.075 mm to approximately 4.75 mm; and recycled coarse aggregates selected from one or more of construction waste recycled concrete aggregates or construction waste recycled red brick aggregates having a particle size ranging from approximately 4.75 mm to 9.5 mm;

wherein the mass ratio of fine to coarse aggregate is in a range of 1 to 5 and wherein, a concrete block formed from the composition exhibiting a decrease in thermal conductivity with increasing temperature at temperatures causing the particulate glass cullet to melt.

2. The composition of claim 1, wherein the cementitious binder material is in a weight percentage from 5% to 15% of the total composition, and comprises 50-90 wt % ordinary Portland cement and 10-50 wt % alumina cement.

3. The composition of claim 1, wherein the cementitious binder material further includes one or more additives selected from fly ash, GGBS, or silica fume in an amount from 10-50 wt %.

4. The composition of claim 1, further comprising water in a weight percentage from 5% to 10%.

5. The composition of claim 1, wherein the recycled fine aggregates and the recycled coarse aggregates are in a weight percentage from 70-90 wt %.

6. The composition of claim 1, wherein concrete blocks formed from the composition have a density below 2000 kg/m³, a compressive strength not below 7 MPa and a fire resistance period of at least 3 hours.

7. Fire-resistant concrete blocks made from the composition of claim 1.

8. A fire resistant concrete block including at least 70 wt % recycled construction waste starting materials selected from one or more of recycled concrete aggregates or recycled red brick aggregates, the fire resistant concrete block having a compressive strength of at least 7 MPa and comprising:

a cementitious binder material including alumina cement, recycled fine aggregates having 10-50 wt % recycled particulate glass cullet having a particle size of 600 microns or less, with the balance selected from one or more of construction waste recycled concrete aggregates or construction waste recycled red brick aggregates having a particle size ranging from approximately 0.075 mm to approximately 4.75 mm; and recycled coarse aggregates selected from one or more of construction waste recycled concrete aggregates or construction waste recycled red brick aggregates having a size ranging from approximately 4.75 mm to 9.5 mm; and wherein the mass ratio of fine to coarse aggregate is in a range of 1 to 5 and wherein the concrete block exhibits a decrease in thermal conductivity with increasing temperature at temperatures causing the particulate glass cullet to melt.

9. The fire resistant concrete block of claim 8, wherein the cementitious binder material is in a weight percentage from 5% to 15% of the total composition, and comprises 50-90 wt % ordinary Portland cement and 10-50 wt % alumina cement.

10. The fire resistant concrete block of claim 8, wherein the cementitious binder material further includes one or more additives selected from fly ash, GGBS, or silica fume in an amount from 10-50 wt %.

11. The fire resistant concrete block of claim 8, wherein the concrete block has a density below 2000 kg/m³ and a fire resistance period of at least 3 hours.

* * * * *